US007232606B2

(12) United States Patent
Shao et al.

(10) Patent No.: US 7,232,606 B2
(45) Date of Patent: Jun. 19, 2007

(54) SEALANT FOR HIGH STRENGTH CARBON FOAM

(75) Inventors: Richard Liichang Shao, North Royalton, OH (US); Douglas J. Miller, North Olmsted, OH (US); Irwin C. Lewis, Strongsville, OH (US); Robert A. Mercuri, Seven Hills, OH (US)

(73) Assignee: UCAR Carbon Company Inc., Parma, OH (US)

( * ) Notice: Subject to any disclaimer, the term of this patent is extended or adjusted under 35 U.S.C. 154(b) by 0 days.

(21) Appl. No.: 11/137,111

(22) Filed: May 25, 2005

(65) Prior Publication Data

US 2006/0159905 A1 Jul. 20, 2006

Related U.S. Application Data

(63) Continuation-in-part of application No. 10/970,352, filed on Oct. 21, 2004.

(51) Int. Cl.
*B32B 7/12* (2006.01)
(52) U.S. Cl. .............................. 428/317.3; 428/304.4; 428/343
(58) Field of Classification Search ............ 428/317.9, 428/317.1, 317.3, 543, 304.4; 264/29.1; 423/445 R
See application file for complete search history.

(56) References Cited

U.S. PATENT DOCUMENTS

| 3,441,529 | A |   | 4/1969  | Tyler ............................ 260/19 |
| 3,689,591 | A | * | 9/1972  | Lorentz et al. ............. 525/206 |
| 3,844,877 | A | * | 10/1974 | Wessendorf et al. ........ 442/326 |
| 3,960,761 | A |   | 6/1976  | Burger et al. ................ 252/421 |
| 4,816,511 | A | * | 3/1989  | Castonguay et al. ........ 524/496 |
| 5,002,981 | A |   | 3/1991  | Chiu ........................... 523/141 |
| 5,047,225 | A |   | 9/1991  | Kong ....................... 423/447.2 |
| 5,280,063 | A |   | 1/1994  | Lewis et al. ................. 524/594 |
| 5,439,864 | A | * | 8/1995  | Rosin et al. ................ 502/180 |
| 6,214,158 | B1 |  | 4/2001  | Chiu et al. .................. 156/314 |
| 6,849,098 | B1 |  | 2/2005  | Joseph et al. ................ 44/620 |
| 2006/0014908 | A1 | | 1/2006  | Rotermund et al. |

OTHER PUBLICATIONS

Particle Size-US Sieve Series and Tyler Mesh Size Equivalent, available at http://www.azom.com/details.asp?ArticleID=1417, last accessed on Jun. 7, 2006.*
Modifications of Phenolic Precursor Carbon Foam, R.A. Mercuri and J.M. Criscione, Fuel Division of American Chemical Society, 156th Annual Meeting, Proceedings of 9th Carbon Conference, Jun. 16-20, 1969, pp. 206, 207.

* cited by examiner

*Primary Examiner*—Terrel Morris
*Assistant Examiner*—Anish P. Desai
(74) *Attorney, Agent, or Firm*—Waddey & Patterson; James R. Cartiglia

(57) ABSTRACT

A sealant useful for sealing the surfaces of carbon foams to provide a surface useful for, inter alia, composite tooling or other high temperature applications or for bonding of carbon foams together to form larger blocks.

17 Claims, No Drawings

SEALANT FOR HIGH STRENGTH CARBON FOAM

RELATED APPLICATION

This application is a continuation-in-part of copending and commonly assigned U.S. patent application Ser. No. 10/970,352, filed Oct. 21, 2004 and entitled "High Strength Monolithic Carbon Foam," the disclosure of which is incorporated herein by reference.

BACKGROUND OF THE INVENTION

1. Technical Field

The present invention relates to sealing high strength monolithic carbon foams useful for applications including as composite material tooling. More particularly, the present invention relates to a process and material for sealing the surface of blocks of carbon foams to provide a working surface thereon or to permit surfaces of two blocks of foam to be cemented together to form larger blocks. A sealed carbon foam is also provided.

2. Background Art

Carbon foams have attracted considerable recent activity because of their properties of low density, coupled with either very high or low thermal conductivity. Indeed, in their U.S. Pat. No. 6,849,098, Joseph and Rogers describe the use of a carbon foam product as tooling for the production of composite materials. Unfortunately, the foams produced by the processes of the Joseph and Rogers patent are unsuitable for use as tooling without the addition of a layer of a so-called facesheet material, because of the pore structure of the foams, including the open-celled nature with highly interconnected pores. These facesheet materials are used to either completely or partially fill the foam cell volume in the Joseph and Rogers disclosure. However, filling of cells with these facesheet materials will raise the density and reduce the effectiveness of the foam as a lightweight material for use in composite tooling. In addition, the use of these facesheets creates difficulties in adhesion and in terms of lack of thermal expansion compatibility. Also, the Joseph and Rogers foam products likely do not have the required strength to density ratios needed for tooling and other structural applications, and the foams produced in accordance with the Joseph and Rogers techniques are not available in sufficiently large blocks for tooling, thus requiring several blocks to be cemented together; while cementing of blocks together can and is successfully done, the more cemented joints that are present, the less structural integrity the resulting block will have.

Recently, a carbon foam has been developed and commercialized under the trademark GRAFOAM by UCAR Carbon Company Inc. of Wilmington, Del. This foam is monolithic and has a controllable cell structure, where the cell structure, strength and strength to density ratio make the foam suitable for use as composite tooling as well as in other applications. Indeed, a combination of characteristics found in GRAFOAM carbon foam, including strength to density ratios higher than contemplated in the prior art, have been found to be necessary for use of a carbon foam in composite tooling applications.

While such carbon foams have the pore structure to provide low gas permeability in comparison to other open-cell carbon foams available in the market, the open porosity on the carbon foam surface still needs to be sealed in order to make the carbon foam useful for many applications such as tooling. Using carbon foam as core material for sandwiched composite structure also requires sealing. If the foam surface is not adequately sealed, resin will infiltrate into the foam during composite manufacturing processes such as resin infusion and vacuum assisted resin transfer molding.

A carbon foam suitable for applications such as composite tooling has two distinct pore size distributions. One pore size is in the micron meter range; the other in the tens to hundreds micron meters range. The foam has a largely closed cell structure with low interconnectivity. Conventional commercial sealers, depending upon the viscosity, cannot seal the pores. In the case of low-viscosity commercial sealers, sealers will wick into the foam and cannot seal the surface even after many applications. In the case of high-viscosity commercial sealers/adhesives such as those commercially available as Loctite 9394 and 9396, it is found that the sealer skin shrinks during curing, resulting in delamination.

Cements for carbon bodies have been disclosed in the past. For instance, in U.S. Pat. No. 5,002,981, Chiu discloses a carbonaceous cement paste composition having carbonaceous particles and a resin binder system composed of a high-temperature polymeric resin binder and a thermosettable furfuryl alcohol for dissolving the resin, and a heat-activated catalyst for effecting thermosetting of the furfuryl alcohol upon heating. The carbonaceous particles disclosed by Chiu include graphite flour, coke flour, carbon black, pitch coke flour and calcined lampblack flour. The carbonaceous particles are present at from about 20% to about 85% by weight.

Likewise, in U.S. Pat. No. 6,214,158 to Chiu, Lewis and Lewis, a cement paste composition is disclosed, including a catalyst; a carbon filler present in an amount of about 20 to about 60% by weight; a polymerizable monomeric system; and a furan solvent. The curable cement composition may be used along with a pre-coat in an adhesive system for attaching together carbon bodies. The carbon filler can be pitch coke flour, petroleum coke flour, graphite powder, coal, carbon black or mixtures thereof In U.S. Pat. No. 5,280,063, Lewis, Pirro, Greinke, Bretz and Kampe disclose a room temperature setting carbonaceous cement comprising a solid carbonaceous material, a catalyst and a liquid carbonizable component which when treated with the catalyst will provide a carbon yield of at least 40% at an elevated baking temperature and possess a flexural strength which is above at least 750 psi at room temperature and at said elevated temperature.

Tyler, in his U.S. Pat. No. 3,441,529, discloses a thermosetting cement for bonding carbonaceous structures, having a mixture of an oil, a soap, finely-divided carbonaceous particles, furfuryl alcohol, a phenolic novolac resin, and a hardening agent.

Although effective as cements, there is no disclosure in the prior art cement patents of the use of the disclosed cements to either seal carbon foams or bond together blocks of carbon foams, especially those having a pore structure uniquely suited for use in applications such as composite tooling. Carbon foam has an open-celled structure that cannot be sealed easily like a monolithic graphite or other "solid" carbon block (used for tooling).

What is desired therefore, is a material useful for sealing carbon foams, and the sealed carbon foams themselves, especially carbon foams whose pore structure, strength, and strength to density ratio is suitable for use in application such as composite tooling.

SUMMARY OF THE INVENTION

The present invention provides a sealant material for carbon foam which is uniquely capable of use in applications such as for composite tooling. The inventive sealant material can effectively fill the relatively small cells and bimodal cell structure of the foam, which has a combination of larger and smaller relatively spherical pores. This unique pore structure is required in the foam if the foam is to be used in applications such as composite tooling. Use of the inventive sealant thus provides a surface useful for composite tooling applications without use of facesheets and the like. In addition, the sealant material can seal the mating surfaces of the carbon foam so as to permit adjoining blocks of carbon foam to be cemented together to provide blocks of sizes not heretofore obtainable in monolithic form.

The inventive material comprises a resinous sealant having a filler present at a level of between about 20% and about 85% by weight, more preferably about 50% to about 85% by weight, of the sealant material. The filler is comprised of two sets of particles having differing size distributions. The two sets of particles in the filler can be denoted a first filler fraction and a second filler fraction. The particles of the first filler fraction preferably have an average diameter at least two times, and more preferably at least four times, that of the particles of the second filler fraction.

The first filler fraction has a particle size distribution wherein at least 80% of the particles are between about 2 microns and about 500 microns, preferably between about 2 microns and about 300 microns, in diameter. The particles of the first filler fraction advantageously have an average diameter of less than about 120 microns, preferably less than about 100 microns. Most preferably, the average diameter of the particles of the first filler fraction is between about 10 microns and about 90 microns. The first filler fraction should comprise about 12% to about 50% by weight of the inventive sealant material, more preferably about 34% to about 50% by weight of the sealant.

The second filler fraction comprises particles having an average particle size of between about 0.2 to about 10 microns, more preferably about 0.5 to about 5 microns. In a most preferred embodiment, the second filler fraction comprises particles having an average particle size of about 0.5 to about 2 microns. The second filler fraction comprises about 8% to about 35% of the sealant material, by weight, more preferably about 20% to about 35% of the sealant material.

The materials from which the filler fractions are made can be the same or different for the two fractions. Preferably, the particles are as close to spherical as possible, having an aspect ratio (the ratio of the diameter of the particle in one direction versus the diameter of the particle in an orthogonal direction, with the larger measurement used as the numerator) of no greater than about 1.4, in order to provide particles of a relatively low surface area (as compared to particles having a higher aspect ratio) to improve wettability in the sealant solution. Nonetheless, filler particles having aspect ratios up to or even greater than about 10 can be used. The filler particles can be any materials which can be prepared in the desired particle sizes and distributions, including metals and ceramics such as silicon carbide. Most preferably, the filler particles are formed of a carbonaceous material in order to more closely match the coefficient of thermal expansion (CTE) of the foam. The first filler fraction preferably comprises carbon and/or graphite, whereas the second filler fraction preferably comprises carbon black.

To form the inventive sealant material, the filler fractions are mixed into a curable material, of low enough viscosity to enable coating of the surface of the foam with the sealant material. Advantageously, the curable material is a resin system, using either a liquid resin, or a solid resin dissolved in a suitable solvent. The resin system is preferably either thermosetting or thermosettable. The resin system used should, after curing, be stable up to or above the temperatures of the applications for which it is to be employed. For instance, for use of the sealed foam in composite tooling applications, where the foam is expect to be exposed to relatively high temperatures, on the order of 300° C. or higher, the resin system should be stable after curing at such temperatures. For lower temperature applications, such as use as structural materials in, e.g., naval vessels, lower temperature stability, such as up to temperatures of 200° C. or higher, is all that is required of the resin system.

The inventive sealant material forms, after curing, a thin layer on a surface of the foam, on the order of about 1000 microns in thickness or less, and is well bonded to the cellular carbon foam surface. Essentially, this effectively converts the carbon foam surface morphology into a monolithic fine-grain graphite like surface. The thin layer is well bonded to the carbon foam because the filler particles provide structural stability and also moderate the relatively high coefficient of thermal expansion (CTE) of the resin component to give close CTE match with the carbon foam. The filler particles also help limit the amount of the liquid component in the sealant available to infiltrate into carbon foam. The modified surface morphology with the sealer layer makes it possible to further seal the surface with a typical mold sealer without fillers.

In one embodiment of the invention, the sealant material comprises a filler comprising two fractions as described above, incorporated into a carbonaceous two component thermosetting system which will set at room temperature to provide a rigid sealant with an average strength of at least about 750 psi. This sealant increases substantially in strength after full curing at 150° C. and retains a high strength after baking to 850° C.

This carbonaceous sealant material broadly comprises a solid component of a carbonaceous material, a catalyst and a liquid carbonizable component. The solid component preferably comprises an admixture of carbonaceous particles, a phenolic resin and a strong acid catalyst selected from the group consisting of p-toluene sulfonic acid, benzene sulfonic acid, tri-chloroacetic acid, naphthalene disulfonic acid, benzene disulfonic acid, tri-fluroacetic acid, sulfuric acid and methanesulfonic acid. The liquid component is preferably composed of a liquid phenolic dissolved in furfuraldehyde.

The liquid component of the present sealant material when combined with the catalyst of the solid component provides a very high carbon yield of at least 40-50% on baking, resulting in a retention of strength at high temperatures.

In an alternative embodiment, the inventive sealant comprises a filler comprising at least two fractions, as described above; a high temperature thermosetting polymeric resin which is thermally stable up to 500° C. in its cured state; a thermosettable furan selected from the group consisting of furfural, and furfuryl alcohol; and a heat-activated catalyst for the thermosettable furan.

As noted, the high-temperature resin in the sealant material of the invention is a resin which is stable in its cured state at temperatures up to about 500° C. In addition, the resin, before it is cured, should be soluble in a solvent to form a relatively homogeneous liquid to allow the combining of the high-temperature resin with the other components to form the sealant material. The thermosettable furan liquid can serve as a solvent for the high temperature resin.

Suitable high-temperature resins include, for example, polyimides, polybenzimidazoles, bismaleimides, polyarylketones, and polyphenylene sulfides, or a polymerizable monomeric system consisting of an aromatic tetracarboxylic acid, an aromatic diamine and a monoalkyl ester. Preferred high-temperature resins are fluorinated polyimides or the described polymerizable monomeric system. The amount of high-temperature resin in the sealant may be from about 5% to about 30% by weight, preferably from about 10% to about 20% by weight.

The liquid thermosettable furan of this alternative embodiment is furfural or furfuryl alcohol and is present at a level of from about 20% to about 45%, preferably from about 30% to about 40%, based upon the total weight of the sealant material. The thermosettable furan should also be liquid to facilitate formation of the sealant material. In addition, the thermosettable furan preferably acts as a solvent to the high-temperature resin to further assist in formation of the inventive material. Furfuryl alcohol is a preferred thermosettable furan because of the high solubility for the high temperature resins and its known compatibility with carbon and graphite.

The filler-containing sealant of this embodiment also contains a heat-activated catalyst to catalyze the thermosettable furan when the sealant is heated. When the furan component is furfuryl alcohols, then most suitable catalysts are weakly acidic catalysts, such as zinc chloride, maleic acid, citric acid, tartaric acid, phthalic anhydride and zinc nitrate. Strong acids such as sulfuric acid, and hydrochloric acid can also be used but care must be taken to avoid highly exothermic reaction.

In still another preferred embodiment, the sealant can be composed of a two-component system consisting of a liquid and a solid where the solid contains a novolac phenolic resin and a catalyst. The catalyst is a hexamethylene tetramine which is present at an amount equal to from 4% to 12% of the novolac resin. The remaining components of the solid portion are the carbonaceous solids.

The liquid is a thermosettable furan such as furfuryl alcohol which serves as a solvent for the novolac and can be partially thermoset by the hexamethylene tetramine catalyst. Other basic catalysts can be added to assist in curing of the furfuryl alcohol including triethylenetriamine and ethylene diamine. Acid catalysts should not be used with the novolac resin since they will neutralize the hexamethylene tetramine catalyst needed to cure the novolac.

The use of the inventive sealant material requires an understanding of the porous nature of carbon foams. The surface pores of carbon foam need to be adequately sealed before applying cements. Without sufficiently sealing the surface pores, the liquid binder phase (resin) of the cement will be wicked into the pores of carbon foam rendering a binder deprived joint and consequently poor joint properties. Conventional liquid pre-coat is not workable because of its low viscosity and the high porosity of carbon foam. It is important to minimize the penetration of liquid binder phase (resin) into the foam, otherwise, the foam properties may be changed and warping and/or cracking may occur due to stresses generated after the resin is cured and shrinks. The foam of the invention has other advantages compared to those of the prior art, in that a large amount of the pores are closed pores with limited interconnectivity compared to the open celled highly connected pores of conventional materials.

The inventive sealant is, essentially, a high viscosity "rubbing" compound, which can be applied to the surface of the foam with a gentle, rotational motion to work the filler particles of the sealant material into the open surface pores and fill them as completely as possible. The fillers in the pores should substantially block the pores. Low liquid content in the material would limit the extent of penetration. Any excess should be wiped off to allow the best possible surface condition for the foam. After cuing, the surface can be further sealed with commercial conventional low-viscosity mold sealers to achieve vacuum tightness. Thus, the inventive sealant provides a vacuum tight surface on the carbon foam surface to which it is applied, which permits the use of the foam in applications such as for composite tooling. When used to prepare a surface for bonding, after the sealant material is applied to the respective mating surfaces of the carbon foam blocks to be joined, cement is applied for joining.

The carbon foam for which the inventive sealant material can be used has a density of about 0.05 to about 0.8 grams per cubic centimeter ($g/cm^3$), with a compressive strength of at least about 2000 pounds per square inch (psi) (measured by, for instance, ASTM C695) composite tooling only; core material is lower density material. An important characteristic for the foam when intended for use in a high temperature application is the ratio of strength to density. For such applications, a ratio of strength to density of at least about 7000 $psi/g/cm^3$ is required, more preferably at least about 8000 $psi/g/cm^3$.

The carbon foam should have a relatively uniform distribution of pores in order to provide the required high compressive strength. In addition, the pores should be relatively isotropic, by which is meant that the pores are relatively spherical, meaning that the pores have, on average, an aspect ratio of between about 1.0 (which represents a perfect spherical geometry) and about 1.5. The aspect ratio is determined by dividing the longer dimension of any pore with its shorter dimension.

The foam should have a total porosity of about 50% to about 95%, more preferably about 60% to about 95%. In addition, it has been found highly advantageous to have a bimodal pore distribution, that is, a combination of two average pore sizes, with the primary fraction being the larger size pores and a minor fraction of smaller size pores. Preferably, of the pores, at least about 90% of the pore volume, more preferably at least about 95% of the pore volume should be the larger size fraction, and at least about 1% of the pore volume, more preferably from about 2% to about 10% of the pore volume, should be the smaller size fraction.

The larger pore fraction of the bimodal pore distribution in the carbon foam should be about 10 to about 150 microns in diameter, more preferably about 15 to about 95 microns in diameter, most preferably about 25 to about 95 microns in diameter. The smaller fraction of pores should comprise pores that have a diameter of about 0.8 to about 3.5 microns, more preferably about 1 to about 2 microns. The bimodal nature of the subject carbon foams provide an intermediate structure between open-celled foams and closed-cell foams, thus limiting the liquid permeability of the foam while maintaining a foam structure. Indeed, advantageously, the inventive carbon foams should exhibit a permeability of no greater than about 10.0 darcys, more preferably no greater than about 2.0 darcys (as measured, for instance, by ASTM C577).

Advantageously, to produce the inventive foams, a polymeric foam block, particularly a phenolic foam block, is carbonized in an inert or air-excluded atmosphere, at temperatures which can range from about 500° C., more preferably at least about 800° C., up to about 3200° C. to prepare carbon foams useful in high temperature applications.

After application of the inventive sealant material, the resulting "sealed" carbon foam has a thin layer of cured sealant (or resin) on the sealed surface thereof. Advantageously, this layer of cured sealant has a thickness of about 1000 microns, preferably about 300 microns or less, more preferably about 200 microns or less. Because of the unique cell structure of the foam, the sealant does not penetrate deeply into the foam structure which would undesirably increase foam density and make sealing difficult to achieve.

An object of the invention, therefore, is a sealant material for sealing a surface of carbon foam to provide a surface which enables the foam to be employed in high temperature applications such as composite tooling applications.

Another object of the invention is a sealant material for carbon foam which provides a mating surface for bonding two blocks of carbon foam together.

Still another object of the invention is a process for providing a sealed carbon foam surface which enables the foam to be employed in high temperature applications such as composite tooling applications.

Yet another object of the invention is a process for producing a carbon foam which can be produced in a desired size and configuration, which can be joined to provide larger carbon foam structures.

Another object of the invention is to provide a method of using the inventive sealant material.

These aspects and others that will become apparent to the artisan upon review of the following description can be accomplished by providing a sealant for carbon foams, which includes a resinous sealant having a filler formed of two sets of particles, a first filler fraction and a second filler fraction, each having differing size distributions, with the average diameter of the particles of the first filler fraction at least twice the average diameter of the particles of the second filler fraction. The first filler fraction preferably has a particle size distribution wherein at least 80% of the particles are between about 2 microns and about 500 microns in diameter, more preferably wherein at least 80% of the particles are between about 2 microns and about 300 microns in diameter. The particles of the first filler fraction advantageously have an average diameter of less than about 120 microns, and are about 12% to about 50% by weight of the sealant. Preferably, the second filler fraction comprises particles having an average particle size of between about 0.2 to about 10 microns, and is about 8% to about 35% of the sealant by weight. Advantageously, the first filler fraction and the second filler fraction each include carbonaceous particles, more specifically where the first filler fraction comprises particles of coke, coal or graphite and the second filler fraction comprises particles of carbon black.

The inventive sealant further includes a resin system of low enough viscosity to enable coating of the surface of foam with the sealant, and which is, after curing, stable up to or above the temperatures of the applications for which it is to be employed, more preferably up to temperatures of at least 500° C.

The carbon foam used in the invention preferably has a porosity of between about 50% and about 95%, and has pores of the carbon foam which have, on average, an aspect ratio of between about 1.0 and about 1.5. Advantageously, at least about 90% of the pore volume of the pores of the carbon foam have a diameter of between about 10 and about 150 microns; more preferably, at least about 95% of the pore volume of the pores of the carbon foam have a diameter of between about 25 and about 95 microns.

At least about 1% of the pore volume of the pores of the foam should have a diameter of between about 0.8 and about 3.5 microns; better yet, from about 2% to about 10% of the pore volume of the pores of the carbon foam should have a diameter of about 1 to about 2 microns. A suitable carbon foam has a permeability of no greater than about 10.0 darcys.

The present invention also includes a sealed carbon foam prepared in accordance with the invention.

It is to be understood that both the foregoing general description and the following detailed description provide embodiments of the invention and are intended to provide an overview or framework of understanding to nature and character of the invention as it is claimed.

DETAILED DESCRIPTION OF THE PREFERRED EMBODIMENTS

Carbon foams useful in combination with the sealant material in accordance with the present invention are prepared from polymeric foams, such as polyurethane foams or phenolic foams, with phenolic foams being preferred. Phenolic resins are a large family of polymers and oligomers, composed of a wide variety of structures based on the reaction products of phenols with formaldehyde. Phenolic resins are prepared by the reaction of phenol or substituted phenol with an aldehyde, especially formaldehyde, in the presence of an acidic or basic catalyst. Phenolic resin foam is a cured system composed mainly of closed cells. The resins are generally aqueous resoles catalyzed by sodium hydroxide at a formaldehyde:phenol ratio which can vary, but is preferably about 2:1. Free phenol and formaldehyde content should be low, although urea may be used as a formaldehyde scavenger.

The foam is prepared by adjusting the water content of the resin and adding a surfactant (eg, an ethoxylated nonionic), a blowing agent (eg, pentane, methylene chloride, or chlorofluorocarbon), and a catalyst (eg, toluenesulfonic acid or phenolsulfonic acid). The sulfonic acid catalyzes the reaction, while the exotherm causes the blowing agent, emulsified in the resin, to evaporate and expand the foam. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

The preferred phenol is resorcinol, however, other phenols of the kind which are able to form condensation products with aldehydes can also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p.p'-dihydroxydiphenyl dimethyl methane or hydroxyanthracenes.

The phenols used to make the foam starting material can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used in the process of the invention are those described in U.S. Pat. Nos. 3,960,761 and 5,047,225, the disclosures of which are incorporated herein by reference.

The polymeric foam used as the starting material in the production of the inventive carbon foam should have an initial density which mirrors the desired final density for the carbon foam which is to be formed. In other words, the polymeric foam should have a density of about 0.1 to about 0.8 g/cc, more preferably about 0.1 to about 0.6 g/cc. The cell structure of the polymeric foam should be closed with a porosity of between about 65% and about 95% and a relatively high compressive strength, i.e., on the order of at least about 100 psi, and as high as about 300 psi or higher.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam, but a compressive strength of at least about 2000 psi and, significantly, a ratio of strength to density of at least about 7000 psi/g/cm$^3$, more preferably at least about 8000 psi/g/cm$^3$. The carbon foam has a relatively uniform distribution of isotropic pores having, on average, an aspect ratio of between about 1.0 and about 1.5.

The resulting carbon foam has a total porosity of about 50% to about 95%, more preferably about 70% to about 95% with a bimodal pore distribution; at least about 90%, more preferably at least about 95%, of the pore volume of the pores are about 10 to about 150 microns in diameter, more preferably about 15 to about 95 microns in diameter, most preferably about 25 to about 95 microns in diameter, while at least about 1%, more preferably about 2% to about 10%, of the pore volume of the pores are about 0.8 to about 3.5 microns, more preferably about 1 to about 2 microns, in diameter. The bimodal nature of the inventive foam provides an intermediate structure between open-celled foams and closed-cell foams, limiting the liquid permeability of the foam while maintaining a foam structure. Permeabilities less than about 10.0 darcys, even less than about 2.0 darcys, are preferred, depending on the density of the foam.

Typically, characteristics such as porosity and individual pore size and shape are measured optically, such as by use of an epoxy mount with a microscope using bright field illumination, and are determined using commercially available software, such as Image-Pro Software available from MediaCybernetic of Silver Springs, Md.

As described above, the inventive sealant material comprises a resinous sealant having a filler, especially a carbonaceous filler, present at a level of between about 20% and about 85% by weight, more preferably about 50% to about 85% by weight, of the sealant material. The filler is comprised of two sets of particles having differing size distributions, which can be referred to as a first filler fraction and a second filler fraction. The average diameter of the particles of the first filler fraction should be at least two times and, preferably, at least four times, that of the particles of the second filler fraction.

As discussed above, the first filler fraction has a particle size distribution wherein at least 80% of the particles are between about 2 microns and about 500 microns, preferably between about 2 microns and about 300 microns, in diameter. The particles of the first filler fraction advantageously have an average diameter of less than about 120 microns, preferably less than about 100 microns. Most preferably, the average diameter of the particles of the first filler fraction is between about 10 microns and about 90 microns. The first filler fraction should comprise about 12% to about 50% by weight of the inventive sealant material, more preferably about 34% to about 50% by weight of the sealant.

Again, as discussed above, the second filler fraction comprises particles having an average particle size of between about 0.2 to about 10 microns, more preferably about 0.5 to about 5 microns. In a most preferred embodiment, the second filler fraction comprises particles having an average particle size of about 0.5 to about 2 microns. The second filler fraction comprises about 8% to about 35% of the sealant material, by weight, more preferably about 20% to about 35% of the sealant material.

The two filler fractions can be the same or different materials, although it is preferred that the particles are as close to spherical as possible, having an aspect ratio (the ratio of the diameter of the particle in one direction versus the diameter of the particle in an orthogonal direction, with the larger measurement used as the numerator) of no greater than about 1.4, in order to provide particles of a relatively low surface area (as compared to particles having a higher aspect ratio) to improve wettability in the sealant solution. Nonetheless, filler particles having aspect ratios up to or greater than about 10 can be used. The filler particles can be any materials which can be prepared in the desired particle sizes and distributions (and shape), including metals and ceramics such as silicon carbide. Most preferably, the filler particles are formed of a carbonaceous material in order to more closely match the coefficient of thermal expansion (CTE) of the foam. The first filler fraction preferably comprises particles of carbon and/or graphite, especially coke or graphite powder (or flour). The second filler fraction preferably comprises carbon black. One suitable carbon black that can be used is available under the tradename THERMAX from Cancarb Company of Medicine Hat, Alberta, Canada Preferably, the carbonaceous sealant material of the present invention is provided as a two-component system. The two-component system includes a solid portion and a liquid portion with the solid portion preferably comprising a mixture of a solid phenolic resin, the carbonaceous filler fractions described above and a solid catalyst. When the phenolic resin is a novolac, The catalyst should be an amine such as hexamethylene tetramine.

The carbonaceous sealant material for the present invention can also be provided as a two- or three-component system. The two-component system includes a solid portion and a liquid portion with the solid portion preferably comprising a mixture of a solid phenolic resin, the carbonaceous filler fractions described above and a solid acid catalyst. The solid acid catalyst should be selected from the group consisting of p-toluene sulfonic acid, benzene sulfonic acid, tri-chloracetic acid, naphthalene disulfonic acid, benzene disulfonic acid, tri-fluroacetic acid, sulfuric acid, and methanesulfonic acid. The solid phenolic resin can be omitted from the solid component but the strength will be reduced.

The liquid portion comprises a solution of a phenolic resin in furfuraldehyde. Any conventional phenolic resin preferably of the resol type can be employed in the solid and/or liquid portion of the carbonaceous sealant material of the present invention. However, the phenolic resin should not have any amine or basic catalyst component since this will neutralize the acid catalyst of the resin. The acid catalyst catalyzes the polymerization and carbonization of the furfuraldehyde liquid. The liquid containing the dissolved phenolic resin will give a bake carbon yield of at least 40% when treated with the catalyst of the solid component. The phenolic resin can be removed from the liquid portion and still permit room temperature setting by catalysis of furfural. However the liquid carbon yield will be reduced by about one half and the cured and bake strength will also be reduced.

In the two component system the solid component is preferably composed of carbonaceous filler particles, a solid acid catalyst and a solid phenolic resin. The solid component may comprise the filler with the phenolic component omitted but the sealant material strength will be diminished.

The sealant material may also be formulated as a three component system consisting of a solid and liquid component as above described for the two component system with an acid catalyst provided as a separate third component in the form of a fluid solution in water or alcohol.

The minimum concentration of catalyst to achieve a room temperature setting will depend upon the selection of the catalyst. When p-toluene sulfonic acid is used as the acid catalyst a room temperature setting can be achieved in less than twenty four hours with as little as about 2.0 weight percent acid catalyst based upon the weight of the sealant material.

If increased electrical conductivity is required for the sealant material, as in certain applications, iron or steel powder can be added to the solid portion of the sealant material. Suitable amounts of iron or steel particles in the total sealant material of the present invention are from 10% to 40% by weight, preferably from 20% to 30% by weight. A larger amount of p-toluenesulfonic acid is required for room temperature setting when iron or steel particles are present. When the catalyst is p-toluenesulfonic acid, then the weight of catalyst required is about twice that used for a sealant material prepared without the addition of iron.

In another embodiment, the sealant material comprises the noted filler fractions along with a high temperature thermosetting polymeric resin which is thermally stable up to 500° C. in its cured state; a thermosettable furan selected from the group consisting of furfural, and furfuryl alcohol; and a heat-activated catalyst for the thermosettable furan.

As described, the resin in the sealant material of the invention is a resin which is stable in its cured state at temperatures up to the temperature of the application for which the foam is intended. Preferably, the resin in the sealant material is stable in its cured state at temperatures up to about 500° C. In addition, the resin, before it is cured, should be soluble in a solvent to form a relatively homogeneous liquid to allow the combining of the high-temperature resin with the other components to form the sealant material.

Suitable high-temperature resins include, for example, polyimides, polybenzimidazoles, bismaleimides, polyarylketones, and polyphenylene sulfides, and a polymerizable monomeric system consisting of an aromatic tetracarboxylic acid, an aromatic diamine and a monalkyl ester. Preferred high-temperature resins are fluorinated polyimides or the polymerizable monmeric system set out above. The amount of high-temperature resin in the sealant material may be from about 5% to about 30% by weight, preferably from about 10% to about 20% by weight.

The liquid thermosettable furan is furfural or furfuryl alcohol and is present at a level of from about 20% to about 45% of the thermosettable furan, preferably from about 30% to about 40% of the thermosettable furan, based upon the weight of the sealant material. The thermosettable furan should also be liquid to facilitate formation of the sealant material. In addition, the thermosettable furan preferably acts as a solvent to the high-temperature resin to further assist in formation of the inventive material. Furfuryl alcohol is a preferred thermosettable furan because of the high solubility of the high temperature resins and its known compatibility with carbon and graphite.

The filler-containing sealant of this embodiment of the present invention also contains a heat activated catalyst to catalyze the thermosettable furan when the sealant is heated. When the furan component is furfuryl alcohol, then most suitable catalysts are weakly acidic catalysts, such as zinc chloride, maleic acid, citric acid, tartaric acid, phthalic anhydride and zinc nitrate. Strong acids such as sulfuric acid, and hydrochloric acid can also be used but care must be taken to avoid highly exothermic reaction.

The sealant material of this embodiment of the invention is produced by mixing the individual components together by any suitable method using known equipment for mixing like materials. The order in which the components are mixed is not critical, except the heat-activated catalyst for the thermosettable furan should preferably be added last, either by mixing all the components and lastly adding the catalyst, or by separately forming a catalyst-activated thermosettable furan mixture of the catalyst and the furan, and adding this mixture to a premixture of the other components of the sealant material.

A catalyst-activated, heat-curable furan can be prepared by admixing at ambient temperature a major proportion of, for example, furfuryl alcohol and a minor proportion of the heat activated catalyst and water. Typically an aqueous zinc chloride solution catalyst (50% by weight $ZnCl_2$) is used in an amount of about 2% to about 10% by weight catalyst solution, based upon the weight of the furfuryl alcohol.

To use the inventive sealant, the sealant material is applied to the surface of the foam with a gentle, rotational motion to work the filler particles of the material into the open surface pores and fill them as completely as possible in order to substantially block the pores. The relatively low liquid content in the sealant limits the extent of penetration. Excess sealant material is then wiped off to allow the best possible surface condition. Thus, the inventive sealant provides a relatively vacuum tight surface on the carbon foam surface to which it is applied, which permits the use of the foam in applications such as for composite tooling.

When used to prepare a surface for bonding, cement is applied after the sealant material is applied to the respective mating surfaces of the carbon foam blocks to be joined. The surfaces are then joined together, and resulting assembly is heated to a temperature to cure the cement. Preferably a compressive load is applied to the joint after joining the surfaces. The joint is heated to a temperature sufficient to cure the cement and bond the surfaces together. The temperature sufficient to cure the cement is a temperature at which cement composition begins to rapidly polymerize to form a cross-linked structure. After curing, the assembly of foam blocks joined is preferably post-cured at a temperature equal to or greater than the highest temperature the foam is expected to encounter in use.

Accordingly, by the practice of the present invention, sealed carbon foams having heretofore unrecognized characteristics are prepared. These foams have surfaces uniquely capable of use in applications such as composite tooling, as well as the capability to be cemented to other like surfaces to form a bond of strength heretofore unseen. The sealing is performed without the sealant penetrating deeply into the foam.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A sealed carbon foam article comprising a carbon foam having a pore distribution such that from about 90% to about 99% of the pore volume are pores having a diameter between about 10 and about 150 microns and from about 1% to about 10% of the pore volume are pores having a diameter between about 0.8 and about 3.5 microns, the carbon foam having a layer of a sealant comprising a filler comprised of two sets of particles, a first filler fraction and a second filler fraction, each having differing size distributions.

2. The article of claim 1 wherein the sealant layer is not greater than about 1000 microns in thickness.

3. The article of claim 1 wherein the carbon foam has a porosity of between about 50% and about 95%.

4. The article of claim 3 wherein the pores of the carbon foam have, on average, an aspect ratio of between about 1.0 and about 1.5.

5. The article of claim 4 which has a permeability of no greater than about 10.0 darcys.

6. The article of claim 1 wherein the particles of the first filler fraction have an average diameter at least two times that of the particles of the second filler fraction.

7. The article of claim 6 wherein the first filler fraction has a particle size distribution wherein at least 80% of the particles are between about 2 microns and about 500 microns in diameter.

8. The article of claim 7 wherein the first filler fraction has a particle size distribution wherein at least 80% of the particles are between about 2 microns and about 300 microns in diameter.

9. The article of claim 6 wherein the particles of the first filler fraction advantageously have an average diameter of less than about 120 microns.

10. The article of claim 1 wherein the first filler fraction comprises about 12% to about 50% by weight of the sealant.

11. The article of claim 6 wherein the second filler fraction comprises particles having an average particle size of between about 0.2 to about 10 microns.

12. The article of claim 1 wherein the second filler fraction comprises about 8% to about 35% of the sealant by weight.

13. The article of claim 1 wherein the first filler fraction and the second filler fraction each comprise carbonaceous particles.

14. The article of claim 13 wherein the first filler fraction comprises particles of coke, coal or graphite and the second filler fraction comprises particles of carbon black.

15. The article of claim 1 wherein the sealant further comprises a resin system of low enough viscosity to enable coating of the surface of foam with the sealant.

16. The article of claim 15 wherein the resin system is, after curing, stable up to or above the temperatures of the applications for which it is to be employed.

17. The article of claim 16 wherein the resin system is stable, after curing, to temperatures of at least 500° C.

* * * * *